(12) United States Patent  (10) Patent No.: US 6,216,453 B1
Maurer                    (45) Date of Patent:    Apr. 17, 2001

(54) SECONDARY AIR SUPPLY SYSTEM FOR INTERNAL COMBUSTION ENGINE

(76) Inventor: Paul S. Maurer, 8010 Lt. Wm. Clark Rd., Parker, CO (US) 80134

( * ) Notice: Subject to any disclaimer, the term of this patent is extended or adjusted under 35 U.S.C. 154(b) by 0 days.

(21) Appl. No.: 09/180,396
(22) PCT Filed: Nov. 19, 1997
(86) PCT No.: PCT/US97/21026
§ 371 Date: Nov. 10, 1998
§ 102(e) Date: Nov. 10, 1998
(87) PCT Pub. No.: WO98/25013
PCT Pub. Date: Jun. 11, 1998

Related U.S. Application Data

(60) Provisional application No. 60/031,202, filed on Nov. 21, 1996.

(51) Int. Cl.$^7$ .................................................. F01N 3/10
(52) U.S. Cl. .............................................. 60/307; 60/304
(58) Field of Search ........................................ 60/304, 307

(56) References Cited

U.S. PATENT DOCUMENTS

| | | |
|---|---|---|
| 3,106,821 | 10/1963 | Ridgway . |
| 3,314,230 | 4/1967 | Vanderpoel . |
| 3,498,054 | 3/1970 | Theed . |
| 3,672,172 | 6/1972 | Hammond . |
| 3,877,222 | 4/1975 | Scherenberg . |
| 3,877,223 | 4/1975 | Layton . |
| 4,050,429 * | 9/1977 | Yasuhiro et al. ..................... 60/304 |
| 4,084,373 * | 4/1978 | Hashimoto et al. ................... 60/304 |
| 4,085,586 | 4/1978 | Shibata . |
| 4,096,692 | 6/1978 | Nakumura . |
| 5,197,282 | 3/1993 | Kume . |
| 5,338,903 | 8/1994 | Winberg . |
| 5,339,629 | 8/1994 | Winberg et al. . |
| 5,406,788 * | 4/1995 | Dambach et al. ..................... 60/304 |
| 5,755,095 * | 5/1998 | Maurer ................................. 60/307 |

FOREIGN PATENT DOCUMENTS

| | | |
|---|---|---|
| 3926-259 A1 * | 2/1991 | (DE) . |
| 54-141919 * | 11/1979 | (JP) . |
| 55-23359 * | 2/1980 | (JP) . |

* cited by examiner

Primary Examiner—Thomas Denion
Assistant Examiner—Tu M. Nguyen
(74) Attorney, Agent, or Firm—Pittenger&Smith,P.C.

(57) ABSTRACT

A secondary air supply system, for an internal combustion engine having a closed crankcase includes a diaphragm air pump. The pumping chamber has one way valves such that ambient air may enter the pumping chamber only through the inlet port and exit the pumping chamber only through the outlet port to supply secondary air to the exhaust system. The actuating chamber of the diaphragm air pump is in airflow communication with the engine crankcase. The diaphragm air pump has a biasing means, either integral to the diaphragm or by a spring which acts on the diaphragm. The biasing means is calibrated to minimize the intensity differential between the positive and negative crankcase pressure pulses.

4 Claims, 4 Drawing Sheets

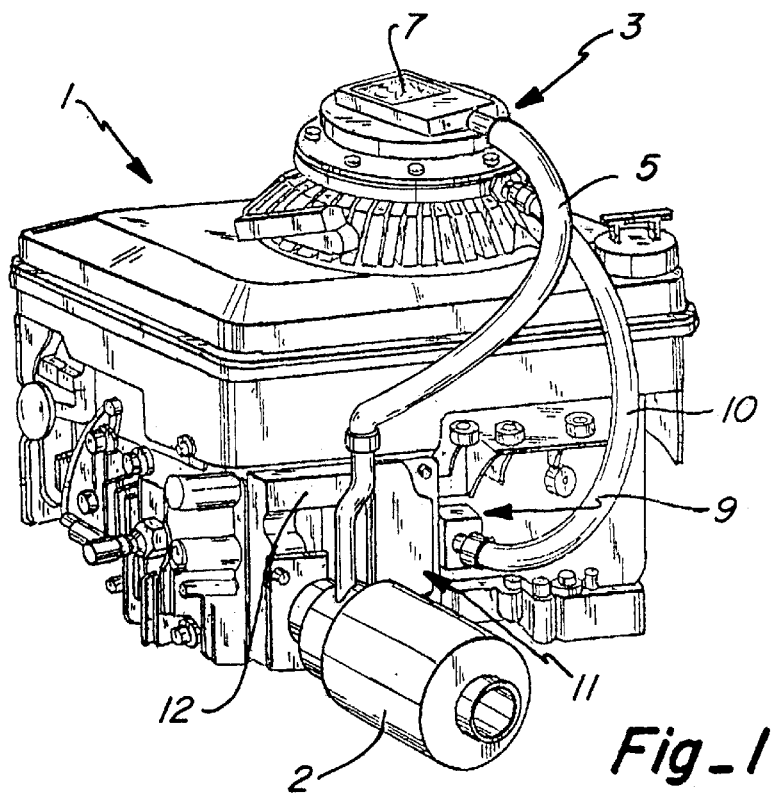
Fig_1
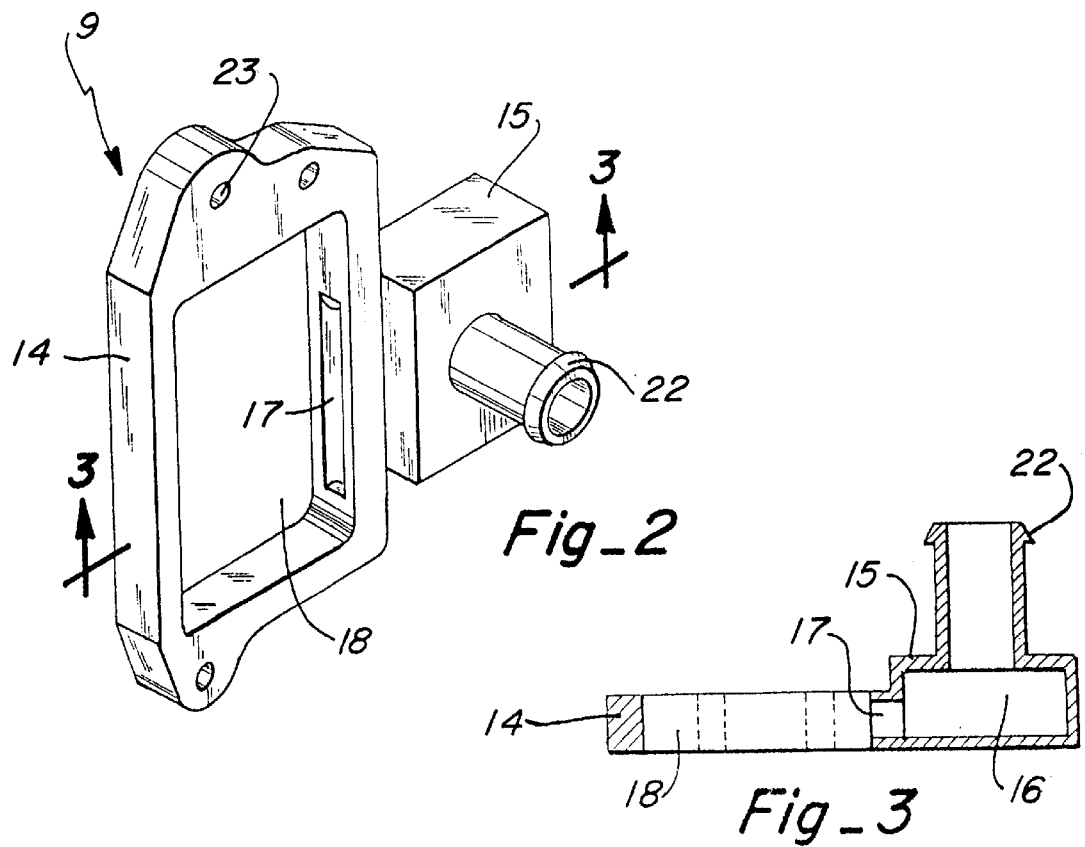
Fig_2
Fig_3

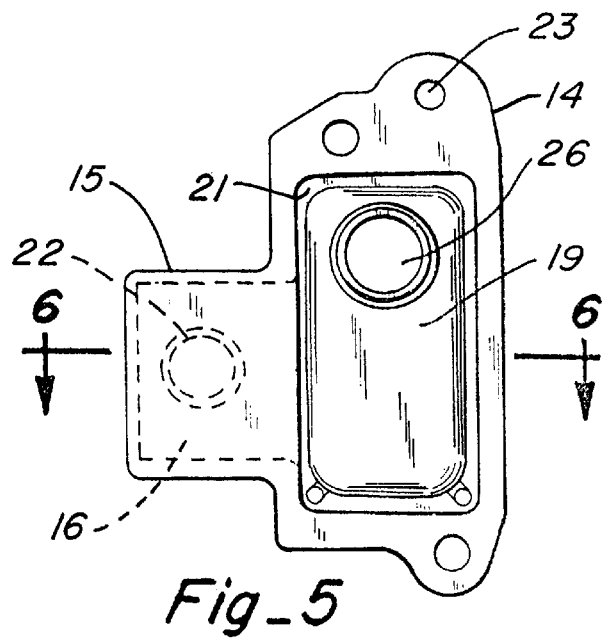
Fig_5
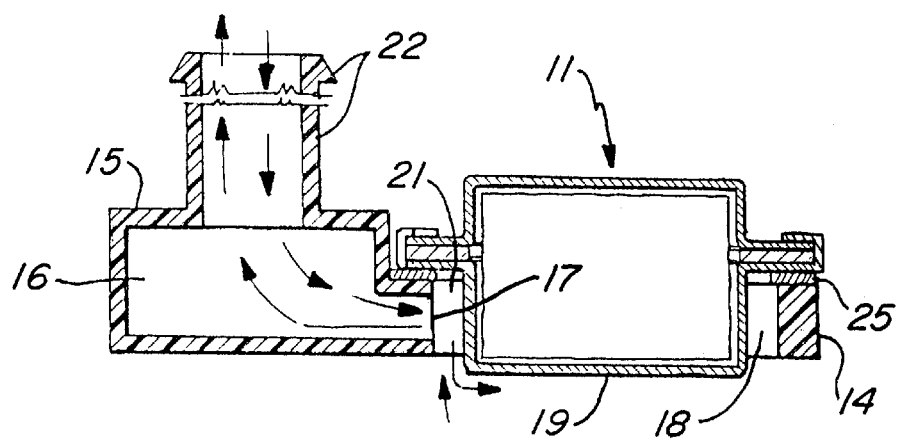
Fig_6

SECONDARY AIR SUPPLY SYSTEM FOR INTERNAL COMBUSTION ENGINE

This application claims benefit to Provisional Application 60/031,202 filed Nov. 21, 1996.

BACKGROUND OF THE INVENTION

The present invention is a secondary air supply system for an internal combustion engine. In a given engine, one or more pistons reciprocate in cylinders, and the exhaust gas resulting from the combustion process is exhausted into an exhaust system. If sufficient oxygen is available in the exhaust gas, then unburned hydrocarbons and carbon monoxide contained in the exhaust gas may be further oxidized in the exhaust system, thereby reducing such undesirable emissions. The exhaust system may contain a catalytic converter to catalyze, or promote, such oxidation reaction, or, in a process known as thermal oxidation, such oxidation reaction may be induced without a catalyst if the exhaust gas is of a sufficiently high temperature. The required excess oxygen for such oxidation reaction is furnished by injecting air into the exhaust system immediately downstream from the exhaust port and upstream from any catalytic converter or muffler. Such air is referred to as secondary air, in contrast to the air taken in by the engine and mixed with fuel, which is referred to as primary air.

Four-cycle engines having a closed crankcase produce crankcase gases during operation. Such crankcase gases principally result from combustion gases escaping past piston rings, and from the vaporization of moisture and fuel which enter the crankcase. Unless such gases are vented, increasing pressure in the crankcase will cause the engine to lose power and the oil seals and gaskets to leak, and will force lubricating oil in the crankcase to leak past piston rings and into the combustion chamber. In addition, failure to vent such gases will result in premature engine oil contamination and consequent accelerated wear on internal engine parts. Thus, four-cycle engines require a crankcase breather system to allow venting of such crankcase gases. All four-cycle engines for which the present invention is intended, particularly inexpensive single-cylinder utility engines, incorporate some form of crankcase breather system.

In a two-cycle engine, a reed valve assembly is usually employed to control the flow of air and fuel mixture into the closed crankcase of the engine. Such reed valve assembly is attached to the intake port of the engine block or case.

Secondary air is generally introduced into the exhaust system of an internal combustion engine in one or more of the following ways:

(i) A siphon arrangement employing a one-way valve, whereby negative pressure pulses in the exhaust gas flow draw in air under ambient atmospheric pressure. In other words, the flowing exhaust gas sucks in the secondary air through a one-way valve fitted to the exhaust system for that purpose.

(ii) A pump mechanically driven by the engine pumps the secondary air into the exhaust system.

(iii) A diaphragm-type pump, operated by pressure pulsations produced by one or more engine sources, pumps the secondary air into the exhaust system.

The first type of secondary air supply system mentioned above (the one-way siphon valve) is easy and inexpensive to construct, but has a major drawback in that the amount of secondary air introduced decreases as the amount of exhaust gas flow increases. The result is that at operating conditions other than light engine throttle, there will be insufficient secondary air to permit complete oxidation of undesirable engine emissions. Examples of such air siphon methodology are disclosed in U.S. Pat. Nos. 5,338,903 and 5,339,629.

The second type of secondary air supply system mentioned above (the engine-driven pump) is capable of supplying air in proportion to the amount of engine exhaust gas. Such a system, however, has several major drawbacks. It is expensive relative to other available methods of secondary air supply, and it will result in a net power loss of the engine. In addition, such a system would require major design changes to a utility engine and the vehicle or equipment of which such an engine is a part. These are especially critical issues for small single-cylinder utility engines, which tend to be low-powered and inexpensive, and for which design changes to either the engine or the incorporating equipment could be prohibitively expensive.

The diaphragm air pump (the third system mentioned above) solves the problems associated with the siphon arrangement and the engine-driven air pump. One example of such a diaphragm pump, as driven by engine crankcase pressure pulsations, is disclosed in U.S. Pat. No. 5,197,282. One major drawback of the secondary air supply system disclosed in such patent, however, is that it requires a fitting to be installed in the engine case of an engine unit in order to communicate the crankcase pressure pulsations to the diaphragm air pump. Fitting such a secondary air supply system during the manufacturing of a utility engine would necessitate a design change to the engine case or an extra manufacturing step. With respect to an in-service engine, installing such a system would necessitate a machining step on the engine case and disassembly of the engine in order to remove metal shavings and prevent damage to internal engine parts. Such extensive installation procedures would drastically inhibit the widespread adaptation of such a secondary air supply system to in-service utility engines.

Another major drawback of the secondary air supply system disclosed in U.S. Pat. No. 5,197,282 is that it supplies an insufficient quantity of secondary air when used with a four-cycle engine having a crankcase breather system. Such breather systems employ some form of one-way airflow valve for the purpose of venting crankcase gases and maintaining a slight negative pressure in the engine crankcase. When the crankcase experiences a negative pressure pulse due to movement of the engine's piston in the cylinder, the breather system valve closes and the crankcase is negatively pressurized. When the crankcase experiences a positive pressure pulse due to movement of the piston, the breather system valve is opened and the crankcase gases are expelled through the breather system venting means. Thus, the positive crankcase pressure pulse is largely dissipated through the crankcase breather system, providing a weak or inadequate pressure pulse to the diaphragm air pump disclosed in U.S. Pat. No. 5,197,282.

The prior art also reveals secondary air supply diaphragm pumps driven by the combination of negative pressure pulses from the engine induction and the exhaust gas flow (U.S. Pat. No. 3,498,054), and driven by the engine induction pulses alone but augmented by a siphon valve fitted to the exhaust system to supply additional secondary air (U.S. Pat. No. 4,085,586). The major drawbacks of such combination systems are the complexity and expense of fitting such systems to small, inexpensive single-cylinder utility engines, together with the inadequate quantity of secondary air supplied due to the relatively weak intensity of the induction and exhaust pulsations from such engines.

Another crankcase actuated diaphragm air pump system for supplying secondary air is disclosed in U.S. Pat. No.

4,096,692. This complex system is intended for multicylinder engines, and does not address the problem of a significant intensity differential between the positive and negative pressure pulses in the crankcase due to the operation of a crankcase breather system. This system employs a double spring means operating on the diaphragm not for the purpose of compensating for said pressure intensity differential, but for the purpose of having the springs' resonant frequency determine the engine rotational speed range wherein the pump is operational.

As explained hereinafter, the present invention discloses a crankcase actuated secondary air supply system consisting of (i) an actuator plate to communicate crankcase pressure pulsations to an external diaphragm air pump without the need to modify or disassemble the engine case (as disclosed and allowed in U.S. patent application Ser. No. 08/645,554), and (ii) a diaphragm air pump wherein the displacement of the diaphragm is aided by a spring or other biasing means designed to compensate for the intensity differential between the positive and negative pressure pulses in the crankcase. The relatively inexpensive nature of the utility engines for which the present invention is intended renders secondary air injection the most cost-effective means of significantly reducing undesirable exhaust emissions from such engines. The type of electronic management systems currently found on more expensive engines, such as automotive engines, which provide for careful monitoring and precise control of the engine's air-fuel ratio and exhaust emissions, are too complex and costly to be fitted to such inexpensive utility engines.

SUMMARY OF THE INVENTION

An objective of the present invention is to effect significant reductions of exhaust emissions from small utility engines by fitting such engines with a simple and inexpensive secondary air supply system which does not require engine modifications, disassembly or design changes. The present invention eliminates the defects and drawbacks of the prior art by providing a secondary air supply system which:

(i) introduces a sufficient quantity of secondary air into the exhaust system in proportion to engine speed to permit the oxidation of undesirable exhaust emissions;

(ii) does not induce a net power loss on the engine nor increase fuel consumption;

(iii) is simple and inexpensive to produce, and can be easily fitted to a wide variety of utility engines with little or no disassembly of or modification to the engine or to the vehicle or equipment incorporating the engine;

(iv) does not interfere with the venting of crankcase cases through the crankcase breather system currently fitted to a four-cycle engine; and (v) through biasing of the diaphragm in a diaphragm air pump, provides an improved means of supplying secondary air by compensating for the intensity differential between the positive and negative pressure pulses in the engine crankcase.

The present invention is intended to be used with an engine having a closed crankcase capable of experiencing pressure pulsations produced by the reciprocating motion of a piston in a cylinder. When the piston in the engine is displaced away from the engine crankcase (e.g., on the compression cycle or on the exhaust cycle), the crankcase experiences a negative pressure or vacuum relative to atmospheric pressure. When the piston is displaced toward the crankcase (e.g., on the intake cycle or on the power cycle), the crankcase experiences a positive pressure relative to atmospheric pressure. These pressure pulsations also can occur in multi-cylinder engines having an odd number of cylinders or with particular crank shaft designs.

The present invention comprises a diaphragm air pump actuated by the crankcase pressure pulsations, and an air pump actuator plate. The diaphragm air pump consists of an actuating chamber operatively connected to the actuator plate described below. The actuating chamber of the pump is separated from the pumping chamber of the pump by a flexible diaphragm or membrane designed to oscillate in phase with the rotational speed of the engine. The diaphragm is acted upon, or biased by, a biasing means exerting a force on the diaphragm. When the engine crankcase experiences a negative pressure pulse, said pressure pulse is communicated to the actuating chamber of the diaphragm air pump and the diaphragm is displaced so as to decrease the volume of said actuating chamber and compress said biasing means. When the engine crankcase experiences the ensuing positive pressure pulse, most of said pressure is dissipated by expelling crankcase gases through the crankcase breather system. As a result, a relatively weak pressure pulse is communicated to the actuating chamber of the diaphragm air pump. Said pressure pulse, in conjunction with the force exerted by the biasing means, displaces the diaphragm so as to increase the volume of said actuating chamber. The preferred embodiment for the biasing means is a compression spring.

The pumping chamber of the diaphragm air pump communicates with both an air inlet port and an air outlet port. Air drawn into the pumping chamber through the inlet port is filtered either through a separate filter operatively connected to said inlet port or, as disclosed in U.S. Pat. No. 5,197,282, by operatively connecting said inlet port to the engine's primary air filter. The outlet port is operatively connected to the exhaust system to inject secondary air immediately downstream from the engine's exhaust port. Passage of air through the inlet port and the outlet port is controlled by one-way valves oriented such that air may move in only one direction through the pumping chamber. Secondary air is drawn into the pumping chamber only through the inlet port and inlet valve when the actuating chamber experiences negative pressure and the diaphragm is displaced so as to increase the volume of the pumping chamber and decrease the volume of the actuating chamber. The secondary air in the pumping chamber is then discharged only through the outlet port and outlet valve when the actuating chamber experiences positive pressure and said positive pressure and the force exerted by the biasing means displace the diaphragm so as to decrease the volume of the pumping chamber and increase the volume of the actuating chamber.

The actuator plate of the present invention is disclosed in, and has been allowed pursuant to, U.S. patent application Ser. No. 08/645,554 filed on May 13, 1996. The actuator plate allows the crankcase pressure pulsations produced by the reciprocating motion of the engine's piston to be communicated to the external diaphragm air pump without drilling a hole or installing a hose fitting in the case or block of the engine. For example, the vast majority of small four-cycle utility engines have some form of chamber cast into the engine block for attaching a crankcase breather assembly in order to vent crankcase gases. Said chamber also provides the ideal means of accessing the pressure pulsations produced in the crankcase. The actuator plate fits between the engine block and the engine's current breather assembly, using the same means of attachment as the breather assembly and thus requiring no modification to the engine. The actuator plate allows the pressure pulsations in the crankcase to be communicated to the air pump by means of a hose or other operative connection. The engine's current crankcase breather system remains fully functional. In a two-cycle engine employing a reed plate attached to the inlet port of the engine block, the actuator plate fits between the engine block and the reed plate, using the same means of attachment as the reed plate. Thus, no modifications to the two-cycle engine block are required. The engine crankcase experiences one positive pressure pulse and one negative pressure pulse for each revolution of the engine crankshaft. Thus, a diaphragm air pump actuated by such pressure pulsations, as described above, would supply secondary air to the engine exhaust system in direct proportion to engine rotational speed. During operation, some engine oil may be discharged from the actuator plate into the hose or other connective means providing for airflow communication between said actuator plate and the actuating chamber of the air pump. Although the air pump will operate in any orientation with respect to the engine, a preferred embodiment would place the air pump at a higher elevation on the engine unit than the actuator plate. Such an embodiment will enable the oil to continuously drain back under gravitational force to the crankcase.

The detailed description and specific examples given hereinafter, while indicating preferred embodiments of the invention, are given by way of illustration only. Various changes and modifications within the spirit and scope of the invention will become apparent to those skilled in the art from this detailed description.

BRIEF DESCRIPTION OF THE DRAWINGS

The drawings illustrate a preferred embodiment of the present invention. Referring to the drawings:

FIG. 1 is a drawing of a four-cycle single-cylinder utility engine unit to which a secondary air supply system according to the present invention is applied;

FIG. 2 is a three-dimensional view of one embodiment of the actuator plate incorporated in the secondary air supply system shown in FIG. 1;

FIG. 3 is a sectional view of the actuator plate along the plane of line 3—3 in FIG. 2;

FIG. 5 is a backside view of the actuator plate and crankcase breather assembly from the plane of line 5—5 in FIG. 4;

FIG. 6 is a sectional view of the actuator plate and crankcase breather assembly along the plane of line 6—6 in FIG. 5.

DESCRIPTION OF THE PREFERRED EMBODIMENT

Referring to FIG. 1, a given four-cycle single-cylinder engine unit 1 has an exhaust system connected to its exhaust port, not shown. The exhaust system is comprised of a combined catalytic converter/muffler unit 2 of known origin. Exhaust gas produced by the combustion process in the engine unit 1 is expelled through the exhaust port and into the exhaust system. The exhaust gas then undergoes a secondary oxidation process in the catalytic converter, and after being silenced by the muffler portion of the exhaust system, is discharged into the atmosphere.

Figure 7:
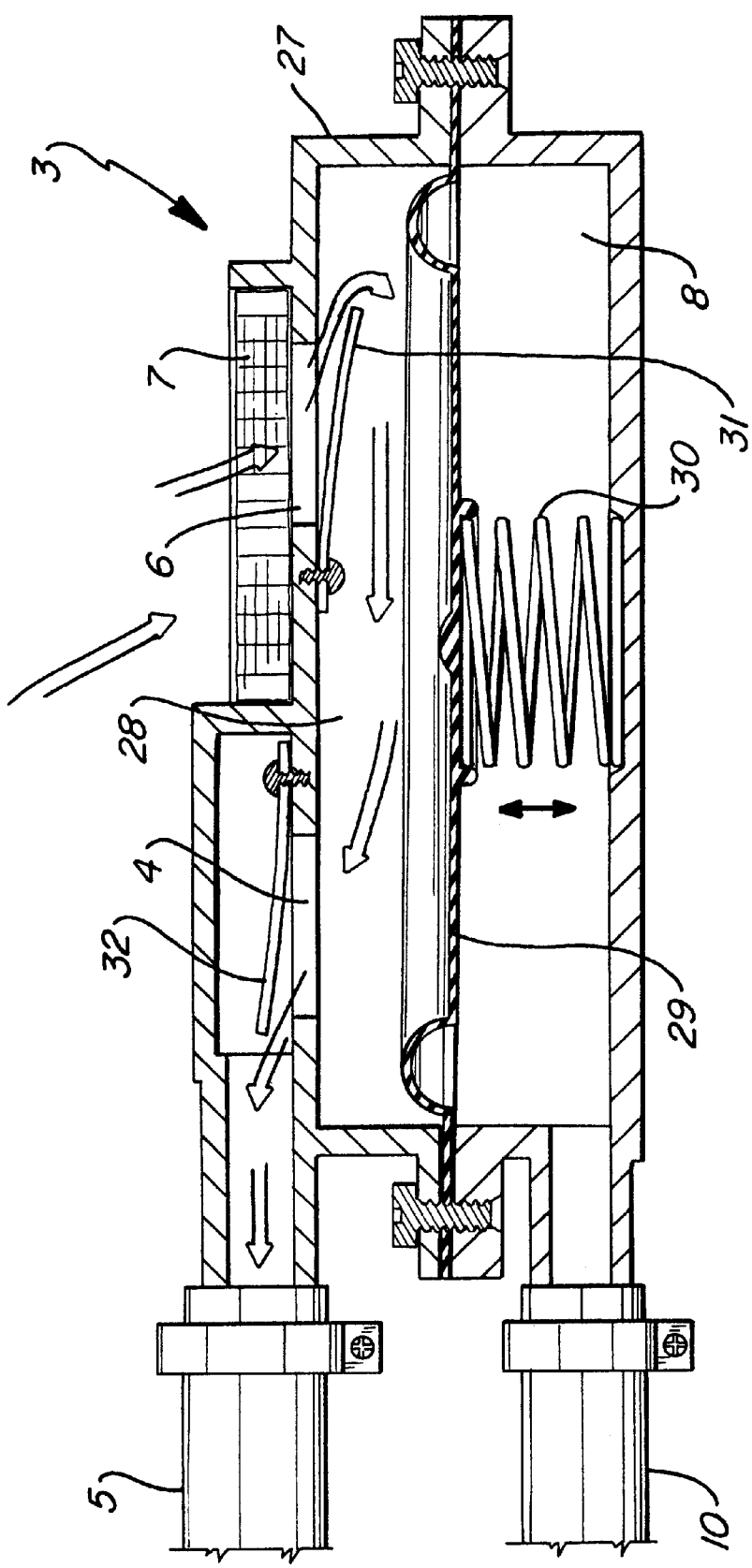
FIG. 7 is a sectional view of the diaphragm air pump incorporated in the secondary air supply system shown in FIG. 1.

The secondary oxidation process which the exhaust gas undergoes in the exhaust system requires the presence of excess oxygen in the exhaust gas. The required excess oxygen is provided by injecting so-called secondary air into the exhaust system between the exhaust port and the catalytic converter/muffler unit 2. The secondary air is pumped into the exhaust system by the diaphragm air pump 3. As shown in FIGS. 1 and 7, the outlet port 4 of said air pump 3 is connected to the exhaust system by means of a hose 5 or other suitable operative connection and fittings of known configuration. The inlet port 6 of said air pump 3 is fitted with a small air filter 7. Alternatively, the inlet port 6 of the air pump 3 may be connected by means of a hose or other operative connection to the engine's primary air cleaner, not shown, such that air drawn into the air pump 3 would be filtered by said primary air cleaner instead of a separate air filter 7 fitted directly to the inlet port 6.

Figure 4:
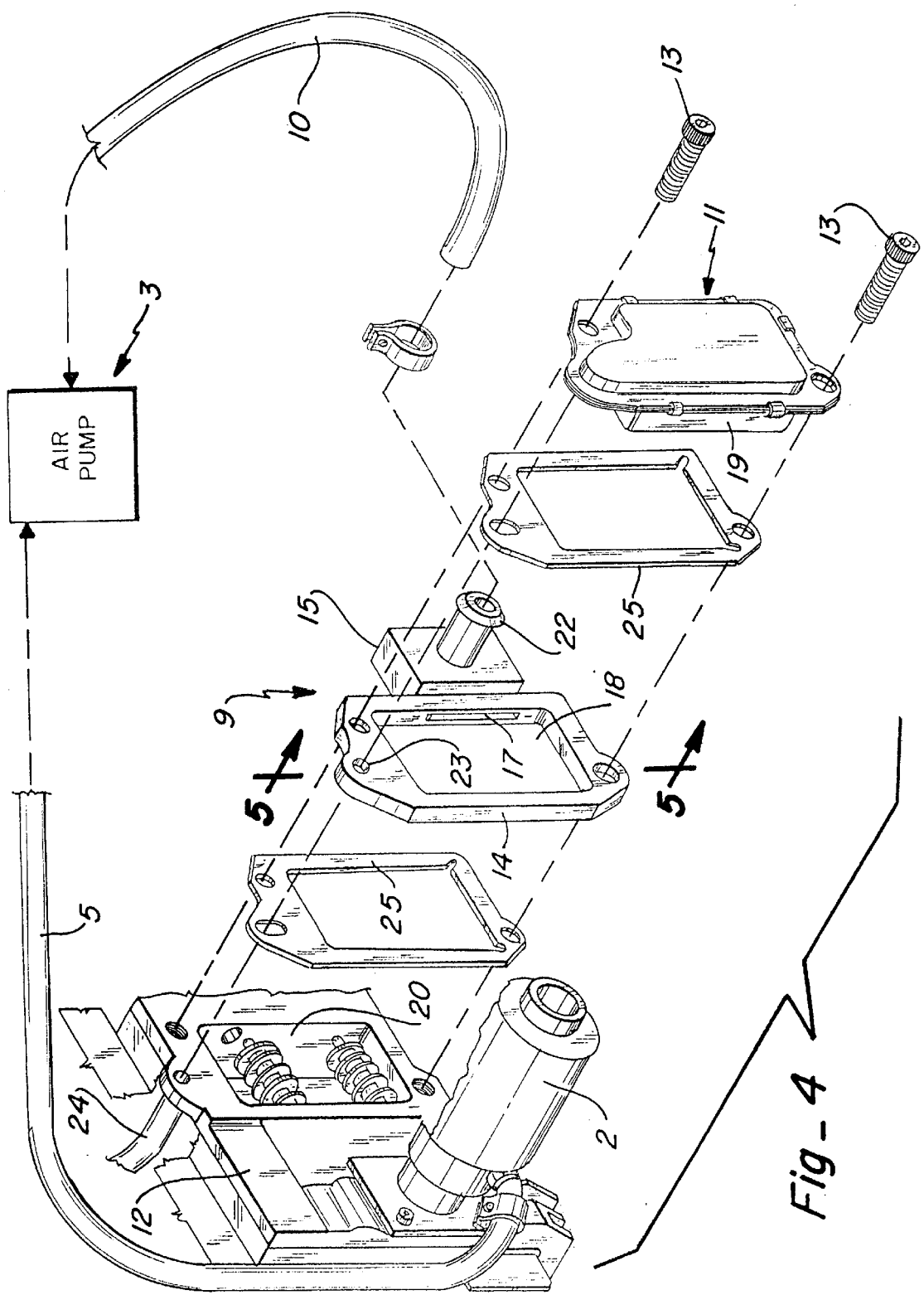
FIG. 4 is an exploded view showing how the actuator plane depicted in FIG. 2 is installed between the crankcase breather assembly and the engine block, and also schematically showing the connection between the actuator plate and the air pump, and the connection between the air pump and the exhaust system.

The actuating chamber 8 of the diaphragm air pump 3 is connected to the actuator plate 9 by means of a hose 10 or other suitable operative connection. Referring to FIG. 4, the actuator plate 9 is fitted to the engine between the engine's breather assembly 11 and the engine block 12, employing the same means of attachment as the breather assembly 11. For example, the same bolts 13 that attach the breather assembly 11 to the engine block 12 will also attach the actuator plate 9. As illustrated in FIG. 1, it is preferable that the air pump 3 be mounted at a higher elevation point an the actuator plate 9, and that the air pump 3 and its fitting for connection to the actuator plate 9 be oriented in such a way that engine oil discharged into the connective means 10 between the actuator plate 9 and the actuating chamber 8 of the air pump 3 may continuously drain back to the engine crankcase, not shown, under gravitational force.

Referring to FIGS. 2 through 6, the actuator plate 9 consists of a spacer 14 and a housing 15 defining a chamber 16 located on one side of the spacer 14. The actuator plate 9 may be made from any material capable of withstanding engine case temperatures and vibration, and exposure to engine oil and gasoline, and which may be machined, cast, molded or pressure or vacuum formed. Materials may include, without limitation, metals, plastics, composites, synthetic resins, ceramics, fiberglass or other suitable materials. A slotted opening or port 17 in the side of the spacer 14 allows said chamber 16 to communicate with the engine crankcase. As previously noted, the actuator plate 9 attaches to the engine block 12 in the same location as the engine's current breather assembly 11, requiring no other disassembly of or modification to the engine. The inner opening 18 of the spacer 14, into which the inner housing 19 of the breather assembly 11 fits, is larger than the breather assembly inner housing 19 but no larger than the engine block opening 20 into which the breather assembly inner housing 19 originally fit. Thus, a gap 21 is provided between the breather assembly inner housing 19 and the surface of the inner opening 18 of the spacer 14. Said gap 21 allows the crankcase pressure pulsations to be communicated to the slotted port 17 in the side of the spacer 14 and, in turn, to the actuator plate chamber 16. The actuator plate chamber 16 is intended to communicate with the air pump 3 by means of a hose 10 or other suitable operative connection. Said hose 10 or other connection may be connected to the actuator plate chamber 16 by means of a separate fitting of known configuration or by a fitting formed integrally 22 with the actuator plate 9. The hole 23 shown in FIG. 2 (a backside view of which is shown in FIG. 5) aligns with a crankcase breather vent hole, not shown, and a corresponding tube 24 to transmit vented crankcase gases to the engine's primary air intake. Reference number 25 denotes gaskets. Reference number 26 denotes a disc valve opening in the crankcase breather assembly inner housing 19 for controlling the flow of vented crankcase gases.

While the foregoing preferred embodiment of the actuator plate was described principally with reference to a four-cycle engine, the actuator plate may also be applied to a two-cycle engine, not shown. As previously described, the actuator plate would fit between the intake port of the engine block and the intake reed plate. The inner opening of the actuator plate would have the same dimensions as the inside dimensions of said intake port. The actuator plate would have the same bolt pattern as the reed plate, so that the fasteners which attach the reed plate to the engine block would also attach the actuator plate. A port through the side of the actuator plate spacer would allow communication if the crankcase pressure pulses to a chamber and fitting on the side of said spacer, said pressure pulses to ultimately be communicated to an external secondary air pump.

Referring to FIG. 7, the diaphragm air pump 3 comprises a pump housing 27 defining therein an actuating chamber 8 and a pumping chamber 28, said chambers being isolated from each other by a flexible diaphragm 29. The diaphragm 29 may be made from any suitable flexible material such as rubber or plastic, for example, and may contain a lightweight stiffening center insert made, for instance, of plastic or metal. The air pump housing 27 may be made from any material capable of withstanding prolonged exposure to vibration and engine oil, including, without limitation, metals, plastics, composites, fiberglass or other suitable materials. The actuating chamber 8 is in airflow communication with the actuator plate chamber 16 by means of a hose 10 or other suitable operative connection. Said hose 10 or other conduit may be connected to the air pump housing 27 by means of a separate hose fitting of a known configuration or by a fitting formed integrally with the air pump housing 27.

The diaphragm 29 is biased by a compression coil spring 30 situated in the actuating chamber 8 of the air pump 3. Alternatively, the diaphragm 29 could be biased by an extension spring, not shown, situated in the pumping chamber 28 of the air pump 3, or said diaphragm 29 could be formed integrally with a biasing means such as a wafer spring, not shown, or a spring rate pre-formed in the diaphragm material itself. When the actuating chamber 8 of the air pump 3 experiences negative pressure or vacuum, the diaphragm 29 is displaced so as to decrease the volume of the actuating chamber 8 and compress the coil spring 30. When the actuating chamber 8 experiences positive pressure, the diaphragm 29 will be displaced in the opposite direction by the combined forces of the compressed spring 30 and the positive pressure, thereby increasing the volume of the actuating chamber 8.

The pumping chamber 28 of the diaphragm air pump 3 is in airflow communication with an inlet port 6 and inlet valve 31 and an outlet port 4 and outlet valve 32. Both the inlet valve 31 and the outlet valve 32 are one-way valves, such that air may enter the pumping chamber 28 only through the inlet valve 31, and air may exit the pumping chamber 28 only through the outlet valve 32. A small air filter 7 may be fitted to the inlet port 6 to filter air drawn into the pumping chamber 28. Alternatively, the inlet port 6 may be connected by a hose or other suitable operative connection to the engine's primary air filter, not shown. The outlet port 4 is connected by a hose 5 or other suitable operative connection to the exhaust system. The outlet port 4 may be connected to said hose 5 by a separate hose fitting of known configuration or by a fitting formed integrally with the air pump housing 27.

When the piston, not shown, in the engine 1 is displaced away from the crankcase, not shown, the effective volume of the crankcase is suddenly increased and the air in the crankcase experiences negative pressure relative to atmospheric pressure. When the piston is displaced toward the crankcase, the effective volume of the crankcase is suddenly decreased and the air in the crankcase experiences positive pressure relative to atmospheric pressure. Thus, the crankcase experiences one negative pressure pulse and one positive pressure pulse for each revolution of the crankshaft, not shown. When the crankcase experiences negative pressure, the pressure variation is communicated (as indicated by the airflow communication arrows shown in FIG. 6) from the actuator plate chamber 16 by the hose 10 or other operative connection to the actuating chamber 8 of the air pump 3. The crankcase breather valve 26 of the crankcase breather assembly 11 is closed to prevent air from being drawn into the crankcase. The diaphragm 29 is displaced so as to increase the volume of the pumping chamber 28, decrease the volume of the actuating chamber 8 and compress the coil spring 30. Air is drawn into the pumping chamber 28 through, in order, the inlet air filter 7, inlet port 6 and inlet valve 31. The negative pressure in the pumping chamber 28 also aids in sealing the outlet valve 32 against its seat, preventing any exhaust gas from being drawn into the pumping chamber 28.

Next, when the crankcase experiences positive pressure, the pressure variation likewise is communicated by the hose 10 or other operative connection to the actuating chamber 8 of the air pump 3. In addition, the crankcase breather valve 26 opens to permit the venting of crankcase gases through, in order, the breather assembly 11, the vent hole 23 through the actuator plate spacer 14, and through the vent tube 24 to the engine's primary air intake. Thus, the positive pressure pulse is largely dissipated through the crankcase breather system. The relatively weak pressure pulse communicated from the actuator plate chamber 16 to the actuating chamber 8 of the air pump 3, in conjunction with the force exerted by the compressed coil spring 30, displace the diaphragm 29 so as to increase the volume of the actuating chamber 8 and decrease the volume of the pumping chamber 28. Air is discharged from the pumping chamber 28 through, in order, the outlet port 4, the outlet valve 32 and the hose 5, and injected into the exhaust system. The positive pressure created in the pumping chamber 28 also aids in sealing the inlet valve 31 against its seat to prevent discharge of any air through the inlet port 6.

As described above, the diaphragm 29 would go through one oscillation or pumping cycle for each revolution of the engine crankshaft. Thus, secondary air is injected by the air pump 3 into the exhaust system in proportion to the rotational speed of the engine. In addition, the actuator plate 9 enables a secondary air supply system as described herein to be fitted to a four-cycle engine unit with no modification or disassembly of the engine (other than removal and reinstallation of the crankcase breather assembly 11), while leaving the engine's crankcase breather system fully functional. The spring rate of the spring 30 or other diaphragm biasing means is chosen to compensate for the intensity differential, due to the operation of said breather system, between the positive and negative pressure pulses communicated from the crankcase to the actuating chamber 8 of the air pump 3, thereby significantly improving the secondary air supply from the present invention over the prior art.

I claim the following:

1. A secondary air supply system for a four-cycle internal combustion engine with one or more cylinders having a crankcase capable of experiencing pressure pulsations resulting from the reciprocating motion of the engine's pistons, and having an exhaust system through which the engine's exhaust gas must pass before being discharged into the atmosphere, said secondary air supply system comprising:

(a) a diaphragm air pump having a housing defining an inner chamber, (b) a diaphragm located in said inner chamber so as to divide said inner chamber into an actuating chamber and a pumping chamber, with said actuating chamber being isolated from said pumping chamber by said diaphragm, (c) said pumping chamber having an air inlet port fitted with a one-way valve such that air may enter the pumping chamber only through said inlet port and one-way valve, (d) said pumping chamber further having an air outlet port fitted with a one-way valve such that air may exit the pumping chamber only through said outlet port and one-way valve, (e) said outlet port being in communication by a connective means to the exhaust system such that air exiting the outlet port of the diaphragm air pump is injected into the exhaust system, (f) said actuating chamber being connected to the engine crankcase such that the actuating chamber and the crankcase are in airflow communication, (g) a biasing means situated in the diaphragm air pump inner chamber such that said biasing means acts on the diaphragm, the biasing force exerted by said biasing means being selected to minimize any differential between the positive and negative pressure pulses communicated from the crankcase to the actuating chamber of the diaphragm air pump, and (h) wherein secondary air is supplied to the exhaust system by the diaphragm air pump in an amount proportional to the rotational speed of the engine and the displacement of the diaphragm caused by the engine crankcase pressure pulsations and the force exerted by the biasing means.

2. A secondary air supply system according to claim 1, wherein the biasing means for the diaphragm is incorporated in or integrally formed with said diaphragm.

3. A secondary air supply system according to claim 1, wherein the pumping chamber inlet port is fitted with an air cleaner means to filter secondary air being drawn into said pumping chamber.

4. A secondary air supply system according to claim 1 having an air filter, wherein the pumping chamber inlet port is connected by a hose or other connective means to the air filter, such that the secondary air drawn into said pumping chamber is filtered.

* * * * *